United States Patent
Wong

(10) Patent No.: US 6,363,653 B1
(45) Date of Patent: Apr. 2, 2002

(54) DEVICE FOR PREVENTING RATS FROM CLIMBING

(75) Inventor: Kinchung Wong, Hong Kong (HK)

(73) Assignee: Maxway International Development Ltd., Hong Kong (*) Notice: Subject to any disclaimer, the term of this patent is extended or adjusted under 35 U.S.C. 154(b) by 0 days.

(21) Appl. No.: 09/486,987

(22) PCT Filed: Sep. 3, 1998

(86) PCT No.: PCT/CN98/00179

§ 371 Date: Mar. 6, 2000

§ 102(e) Date: Mar. 6, 2000

(87) PCT Pub. No.: WO99/11879

PCT Pub. Date: Mar. 11, 1999

(30) Foreign Application Priority Data

Sep. 4, 1997 (CN) ........................................ 97225596 U

(51) Int. Cl.[7] .............................. A01M 1/10; E03F 7/06
(52) U.S. Cl. ................................ 43/58; 52/101; 140/58
(58) Field of Search ............................. 43/58, 1, 121; 114/221 R; 140/58, 59; 52/101; 119/52.3, 57.9; 49/58; 428/573, 99, 100, 115, 907

(56) References Cited

U.S. PATENT DOCUMENTS 727,054 A * 5/1903 Arndt
2,856,724 A   10/1958 Bodenbach
3,407,550 A * 10/1968 Shaw

FOREIGN PATENT DOCUMENTS

WO    WO 89/09858    10/1989

* cited by examiner

Primary Examiner—Michael J. Carone
Assistant Examiner—Andrea M. Valenti
(74) Attorney, Agent, or Firm—Dickinson Wright PLLC

(57) ABSTRACT

A device for preventing rats from climbing, characterized in that the device made of deformable plate (1), such as metal plate, comprises a plurality of adjacently arranged deformable plates (3) and a fixing part (2) for fixing the plurality of deformable plates to a pipe/rod (10) or other desired body which climbing rats is to be prevented. Each of the deformable plates has sharp teeth and/or protrusions at its edges and has an end connected to the fixing part. It is possible for the user to deform and extend the deformable plates in various directions by using tools, so as to form sharp construction around the contour of the pipe/rod (10), thereby preventing rats from climbing. Moreover, the fixing part is provided with a punched structure, through which fixing members such as screw, rope and steel sheet can penetrate for fixing the device or for connecting the device to other device.

6 Claims, 6 Drawing Sheets

DEVICE FOR PREVENTING RATS FROM CLIMBING

TECHNICAL FIELD

The present invention relates to a device for preventing rats from climbing, especially relates to a device made of deformable plate, such as metal plate, to prevent rats from climbing pipes/rods or any other bodies.

1. Background of the Invention

It is well-known that in common families, especially in apartments, food loss or pollutions are often caused by rats, and excretions of rats contain germs, virus and toxin to induce human diseases by infection. Rats could not only destroy furniture, wall corners, and clothes or invade pets, but also moreover bite babies or propagate in rooms.

Rats could be controlled indoors and outdoors. The indoor preventing method such as trapping, binding and poisoning is not always successful due to the suspicion and sensitivity of rats. However the method to block the way for rats entering from outside is most effective. Rats may usually enter a building by climbing along stairs, or the contour of pipes/rods, such as water pipes, from sewers or gutterways, especially by climbing along pipes/rods which are fixed on the outer walls and vertically downwards fed through sewers or gutterways at internal distance.

2. Detailed Description of the Invention

The primary object of the present invention is to provide an effective device to prevent rats from climbing along pipes or tubes into buildings so as to stop the damages of rats.

Another object of the present invention is to provide a simple, easily installed and low cost device for preventing rats from climbing.

A further object of the present invention is to provide an easily dismantling device for preventing rats from climbing.

The device of the present invention for preventing rats from climbing, characterized in which made of deformable plate, such as metal plate, comprises a plurality of adjacently arranged deformable plates and a fixing part for fixing said plurality of deformable plates on a pipe/rod or other desired body for which climbing rats is to be prevented. Each of said deformable plates have sharp teeth and/or protrusions at its edges an has an end connected to said fixing part. Said deformable plates can be deformed and extended in various directions by using tools so as to form a sharp construction around the contour of said pipe/rod or other desired body.

Moreover, said fixing part is provided with a punched structure, through which fixing members, such as screw, rope and steel sheet can penetrate for fixing the device or for connecting one device to another device.

DETAILED DESCRIPTION OF THE PREFERRED EMBODIMENT

Figure 1A:
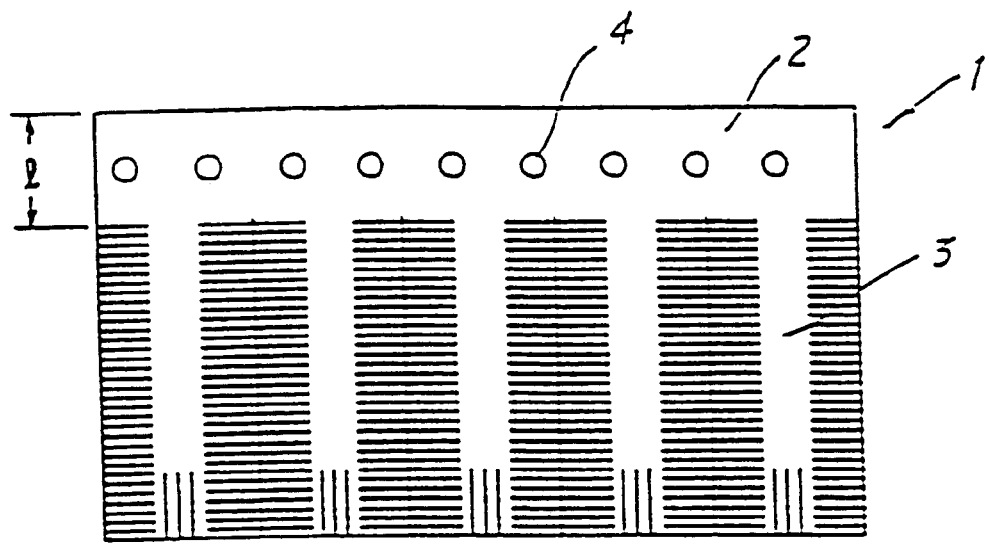
FIG. 1a is a plane schematic view of the first embodiment of the present invention.
Figure 1B:
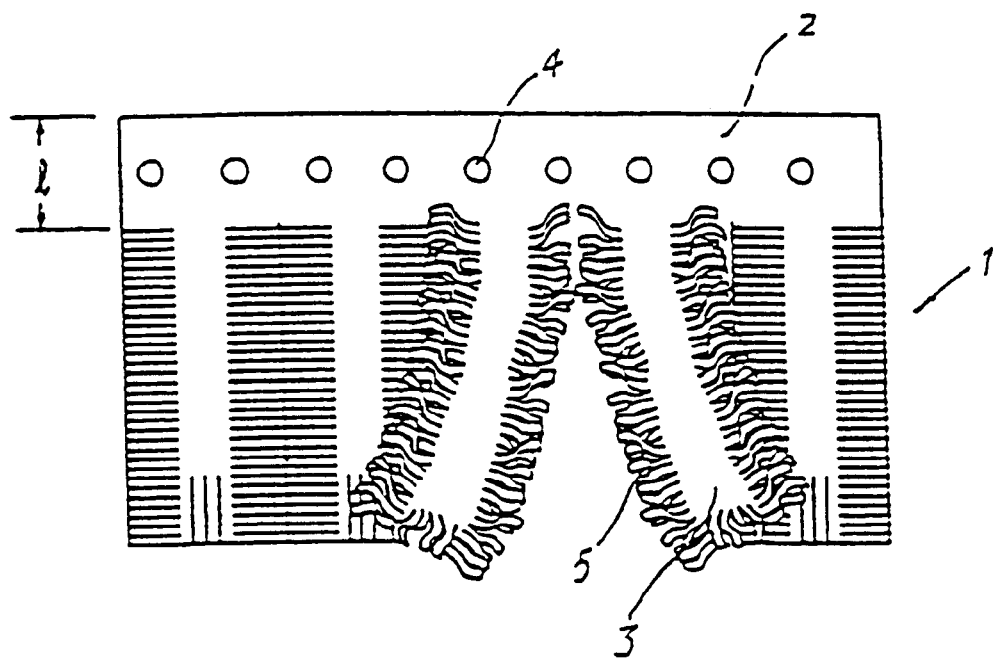
FIG. 1b is a schematic view of the first embodiment of the present invention with deformable plates twisted.
Figure 1C:
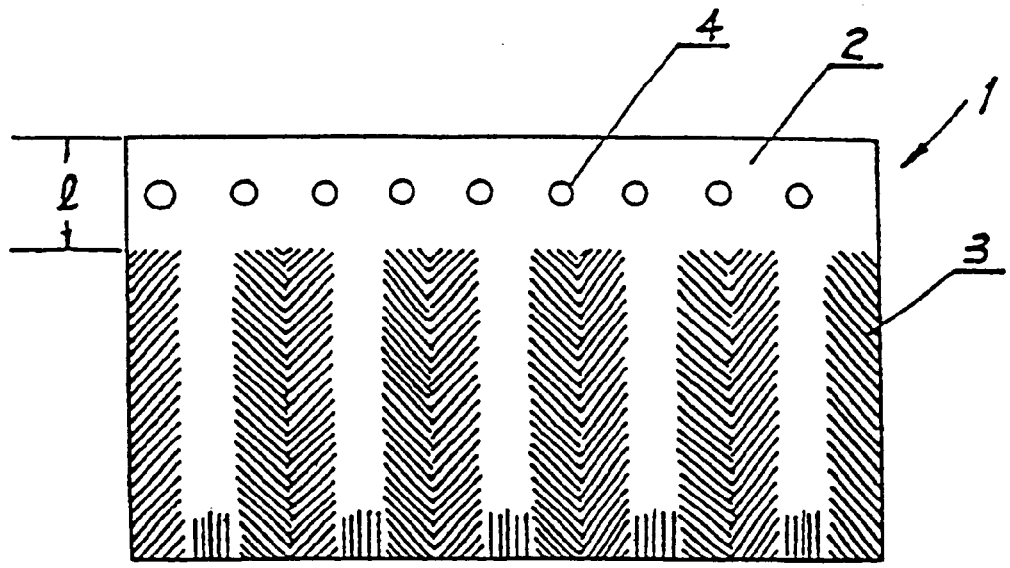
Figure 1D:
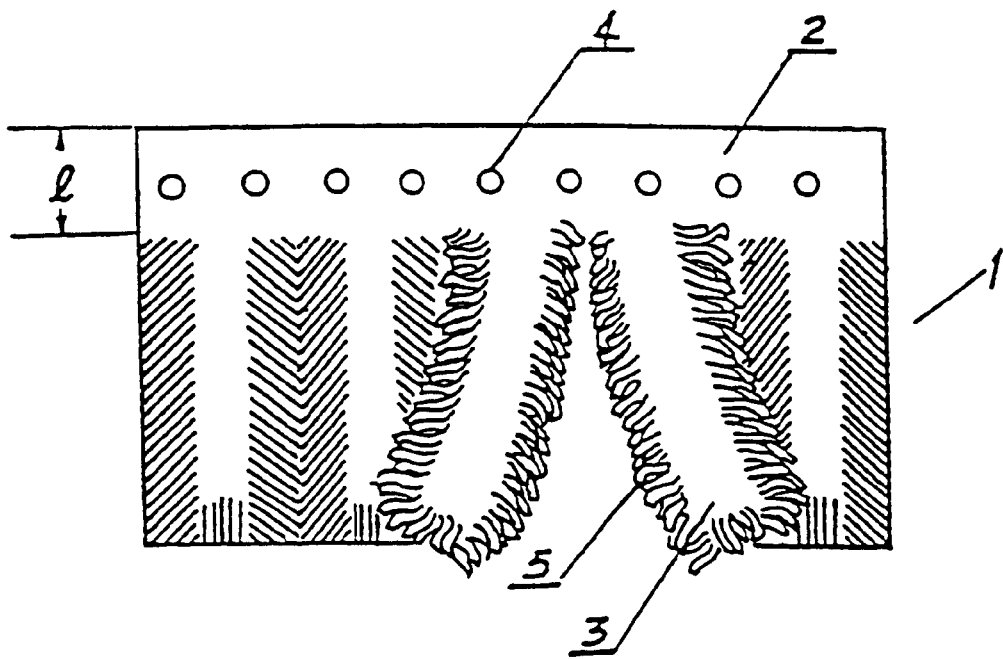

As shown in the FIG. 1a to FIG. 1d, a plate 1 is made of deformable materials, such as metal or other suitable materials. The upper part of the plate 1 is a fixing part 2 with two or more holes 4 on its surface for allowing fixing members, such as screw, rope or steel sheet, to penetrate and fix it. The width of the fixing part 2 is sufficient to support the plate 1, so that the plate 1 could be installed around the contour of a pipe/rod 10, such as water pipe and tube, as shown in FIG. 2. One side of the fixing part 2 is connected to a plurality of adjacently arranged deformable plates 3. Each of the deformable plates 3 has sharp teeth and/or protrusions 5 at its edges and has an end connected to the fixing part 2 (see FIG. 1b, FIG. 1d and FIG. 2). The teeth and/or protrusions 5 located along both sides of the deforming plate 3 are formed into such as a comb-shaped or an inverted V-shaped tangent arrangement etc. (the arrangement style are not all listed here), that is vertical with respect to the central line of the deforming plate, while those located at the lower end of the deforming plate 3 are formed into tangent style that runs in parallel with respect to the central line of the deforming plate.

While installing the plate 1 around the contour of the pipe/rod 10 (see FIG. 2), a fixing member screw 7a is penetrated through two suitable overlapping holes 4 on the superposed parts 6 of the fixing part 2 and locked tightly by a fixing member screw nut 7b. Then the deformable plates 3 are twisted and rotated in various directions and angles with nipper pliers or other tools. By means of the ductility, stiffness, plasticity and deformability of metal, each of deformable plates 3 are deformed and extended in various directions and its teeth and/or protrusions 5 are sticked up or pressed down (see FIG. 1b). The deformable plates 3 and their teeth and/or protrusions 5 may be extended in same or different angles. Because of the stereo-angles between each deformable plates 3 and the sharp and stiff metal edges formed by punching each of the teeth and/or protrusions 5, the device is installed around the contour of the pipe 10 in irregular style with adjustable distances, heights and angles between each other to provide a preventing structure to block the way of animals from climbing. The inventor finds in preparing this preventing structure that because the sharpness and stiffness of teeth and/or protrusions 5 have exceeded his expectation, workers must be careful and wear gloves to avoid injured when they handle the deformable plates 3 extended in various directions by using tools. As this device is installed around the pipes or tubes affixed to the outer walls of apartments, the result is not only rats disappear but also we even do not worry about thieves or any other animals climbing along the pipes and entering into rooms.

Figure 3A:
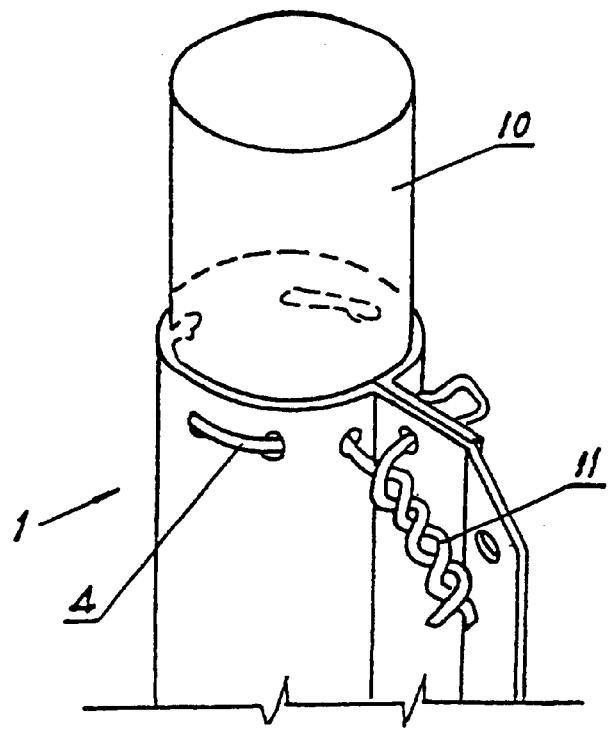
FIG. 3a is a schematic view of the device of the second embodiment of the present invention installed around the contour of the pipe by using a stringlike fixing member.

Furthermore, as shown in FIG. 3, in the second embodiment of present invention it provides a way to penetrate and fit,6 the metal plate 1 around the contour of the pipe 10 by using a fixing member 11, such as rope or wire (see FIG. 3a).

Figure 3B:
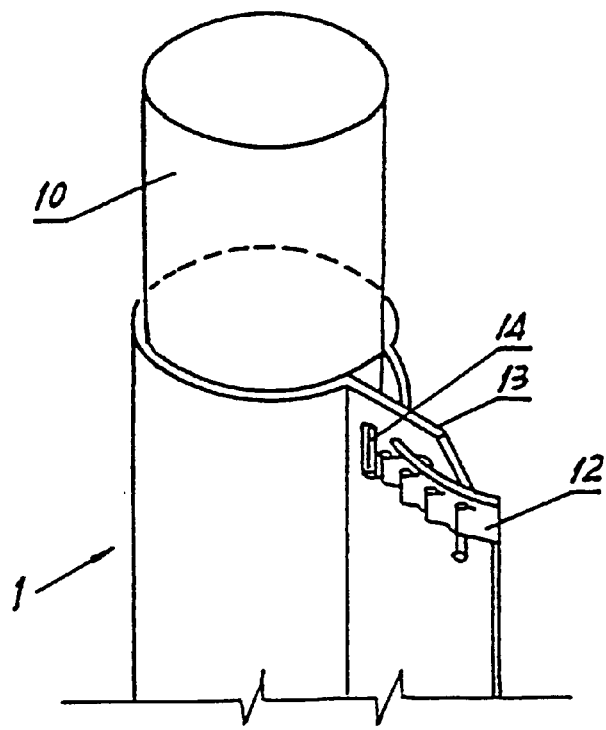
FIG. 3b is a schematic view of the device of the second embodiment of the present invention installed around a pipe by using a stringlike fixing member with slant protrusion.
Figure 4A:
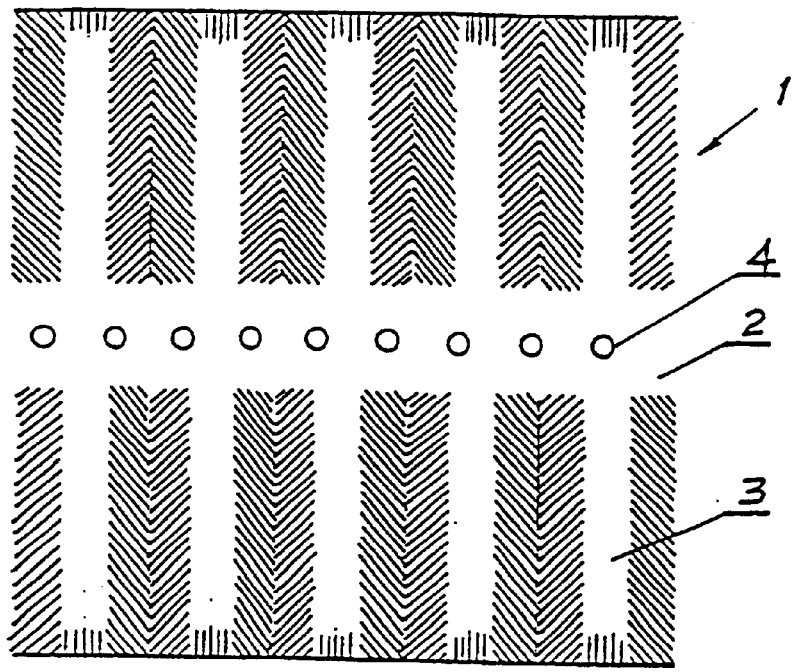
FIG. 4a is a plane schematic view of the third embodiment of the present invention.
Figure 4B:
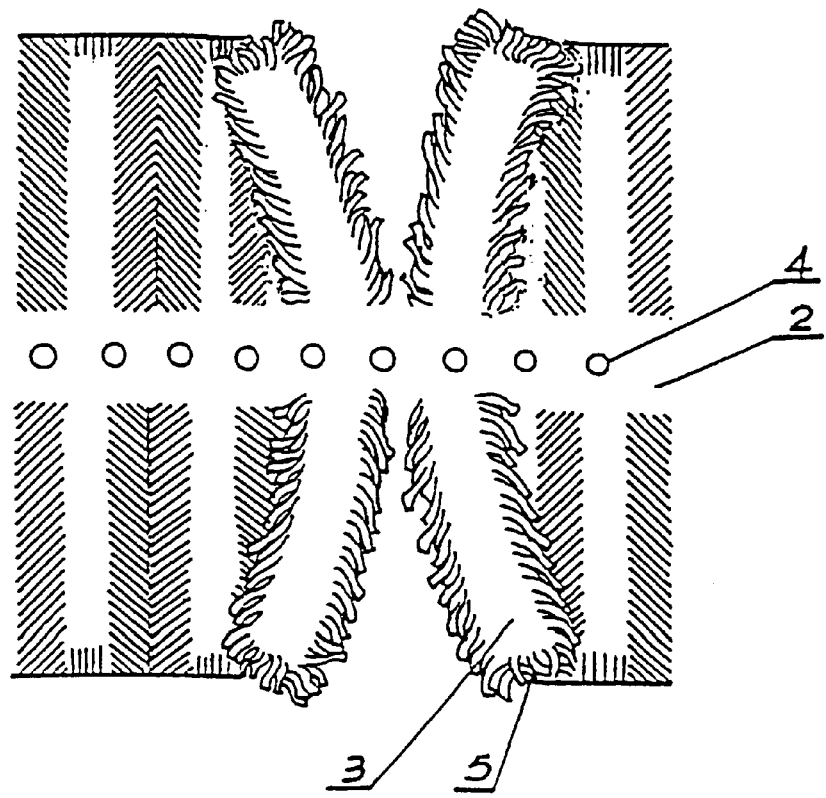
FIG. 4b is the third embodiment of the present invention with the deformable plates twisted.

Also as shown in FIG. 3b, one end on, the length direction of the fixing part 2 can be extended to be a stinglike fixing member 12 with internal arranged slant lug boss 13, which is formed on the fixing member 12 by punching directly or by welding indirectly. Then the metal plate 1 could be installed around the contour of the pipe 10 via penetrating and fixing the fixing member 12 on a hollow slot 14 of the fixing part 2.

Figure 5A:
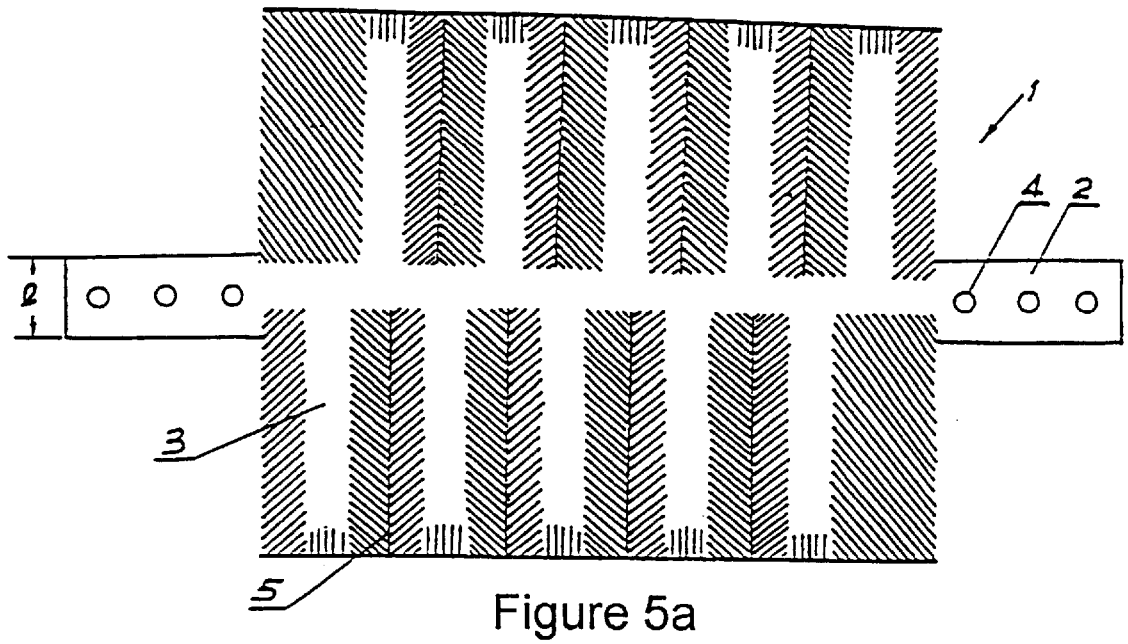
FIG. 5a is a plane schematic view of the fourth embodiment of the present invention.
Figure 5B:
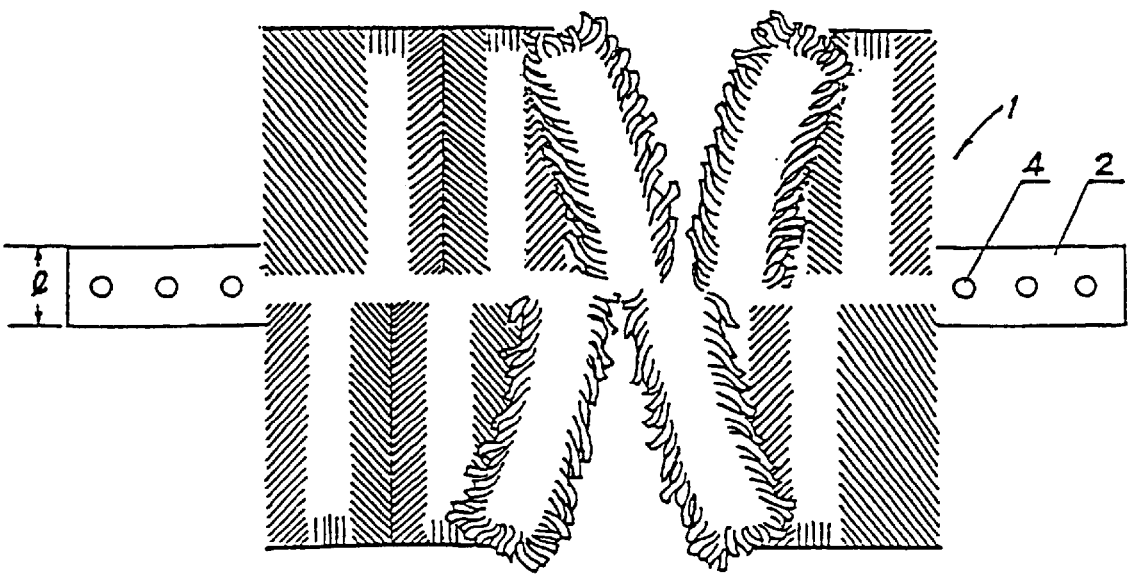
FIG. 5b is the fourth embodiment of the present invention with the deformable plates twisted.

Moreover, it is very convenient to remove the device from the pipe 10 just by loosening the fixing member screw 7a, the fixing member nut 7b, the fixing member 11 and the fixing member 12 from holes 4 on the fixing part 2 or cutting off the fixing part 2 along its width direction 1 (see FIG. 5a and FIG. 5b). Easy to install or dismantle is another merit of the device.

Figure 2:
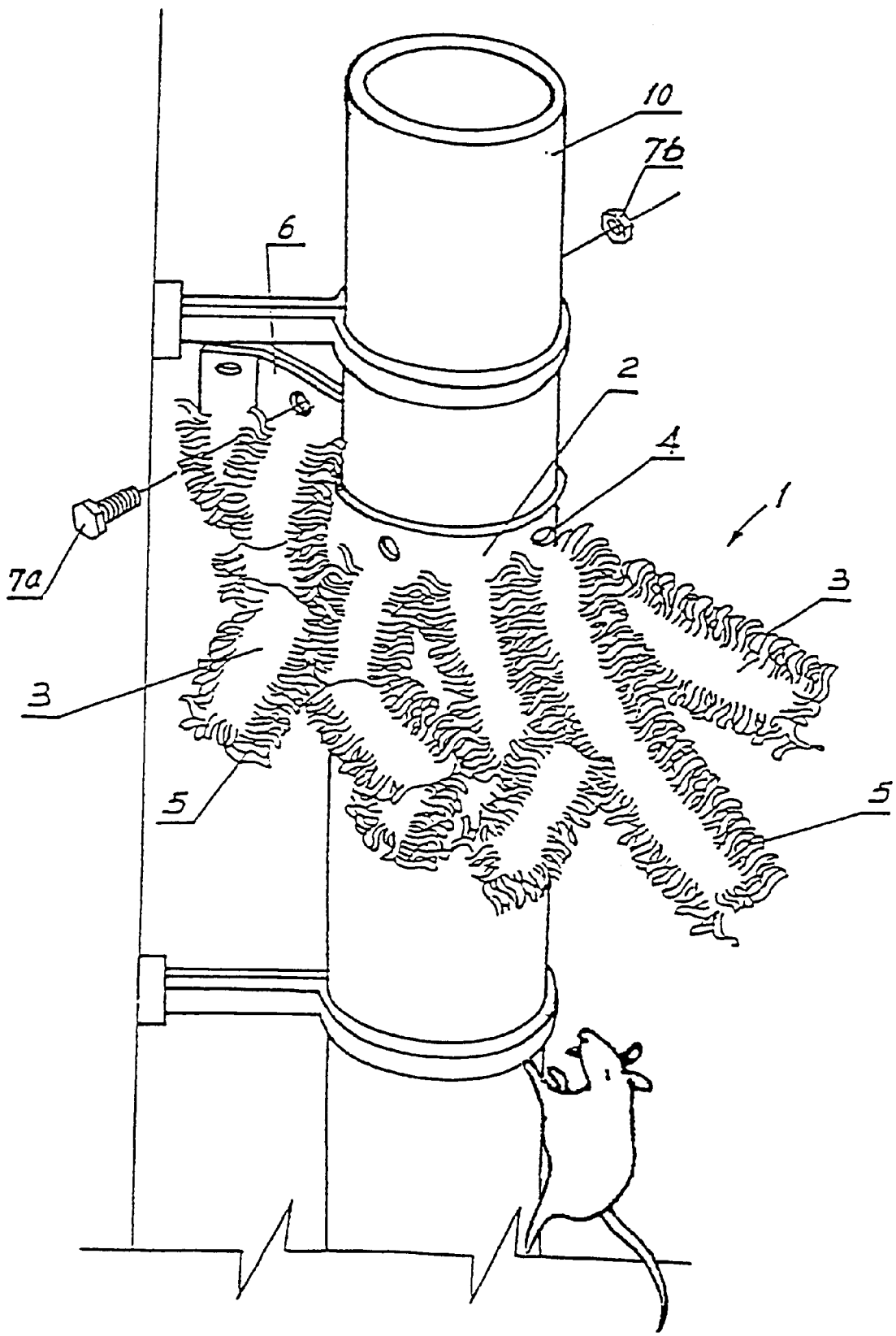
FIG. 2 is a schematic view of the device of the first embodiment of the present invention installed around the contour of a pipe.

As shown in FIG. 1a, the teeth and/or protrusions 5 on both sides of the deforming plate 3 are formed into a comb-shaped tangent arrangement that is vertical with respect to the central line of the deforming plate 3, while these on the lower end of the deforming plate 3 are formed in tangent arrangement that runs in parallel with respect to the central line of the deforming plate 3. However as shown in FIG. 1c, FIG. 1d, FIG. 4 and FIG. 5, the teeth and/or protrusions 5 on both sides of the deforming plate 3 are formed an inverted V-shape tangent arrangement that is symmetrical with respect to the central line of the deforming plate 3, while the teeth and/or protrusions 5 on the lower end of the deforming plate 3 are formed into tangent style that runs in parallel with respect to the central line of the deforming plate 3, so as to increase their sharpness, the fixing member is affixed to the contour of the pipe by being pasted and locked joint thereto. The holes may have round, oval or partial long-hollow shape. The metal plate 1 contains an upper part, a middle part and lower part, in which the upper part and lower part are punched into a plurality of adjacently arranged deformable plates, and the middle part is the fixing part. The two opposite sides of the fixing part are not only connected to these adjacently arranged deformable plates but also have sufficient width to support and fix the metal plate. Alternatively, the part of the fixing part for connecting the deforming plate can be omitted, and only its outboard part for fixing the device is reserved (see FIG. 5a and FIG. 5b). In addition, said fixing part is also provided with two or more holes, through which fixing members such as screw, rope and steel sheet can penetrate for fixing the device.

In summary, the above embodiments are only for describing the invention but not for limiting the range of the invention. All the changes that do not depart from the spirit of this invention are within the range of this invention. In addition, any instruments for preventing rats from climbing according to the spirit of this invention are also within the range of this invention.

Industrial Application

The device for preventing rats from climbing of the present invention is of simple structure, low cost and easily dismantling. It can effectively prevent rats from climbing along a pipe/rod or some other body into buildings, so as to stop damage from rats.

What is claimed is:

1. A device for preventing rats from climbing, which comprises a plurality of adjacently arranged deformable plates and a fixing part for fixing said plurality of deformable plates to a desired item for which rats are to be prevented, wherein said deformable plates are adjacently provided by being set vertically to the length of said fixing part, each of the deformable plates has a plurality of protrusions at its edges and has an end connected to said fixing part, said deformable plates are made by deformation to extend in distinctly different directions so as to form a sharp construction around the contour of the desired item, thereby preventing rats from climbing.

2. A device for preventing rats from climbing in accordance with claim 1, wherein said fixing part is provided with a punched structure, through which fixing members such as screw, rope and steel sheet can penetrate for fixing said device or for connecting said device with another device.

3. A device for preventing rats from climbing in accordance with claim 1, wherein said plurality of adjacently arranged deformable plates are connected to said fixing part at one side of said fixing part.

4. A device for preventing rats from climbing in accordance with claim 1, wherein said plurality of adjacent arranged deformable plates are connected to said fixing part at both sides of said fixing part.

5. A device for preventing rats from climbing in accordance with claim 1, wherein said plurality of adjacently arranged deformable plate may be twisted and rotated in various directions.

6. An instrument for preventing rats from climbing, wherein this instrument is combined by several devices according to claim 1.

* * * * *